United States Patent [19]

Rosman

[11] 3,747,466
[45] July 24, 1973

[54] RIVET FASTENER SYSTEM
[76] Inventor: Irwin E. Rosman, 23710 Clarendon Street, Woodland Hills, Calif.
[22] Filed: June 19, 1970
[21] Appl. No.: 47,825

Related U.S. Application Data
[63] Continuation-in-part of Ser. No. 798,039, Feb. 10, 1969, abandoned, which is a continuation-in-part of Ser. No. 688,416, Dec. 6, 1967, Pat. No. 3,426,641.

[52] U.S. Cl. .......................... 85/37, 29/509, 29/522
[51] Int. Cl... B21d 39/00, B23p 11/02, F16b 19/04
[58] Field of Search .......................... 85/37, 7, 50 R; 29/509 R, 509, 522, 522 R, 526, 512; 287/189.36 D

[56] References Cited
UNITED STATES PATENTS

| 251,788 | 1/1882 | Marker | 85/37 |
| 2,451,356 | 10/1948 | Rechton | 29/509 |
| 2,482,391 | 9/1949 | Webster | 85/37 |
| 2,611,285 | 9/1952 | Gross | 85/37 X |
| 3,426,641 | 2/1969 | Rosman | 85/37 |
| 3,516,699 | 6/1970 | Bergere | 85/37 X |
| 3,526,032 | 9/1970 | Pipher | 85/37 X |
| 3,551,015 | 12/1970 | Whiteside et al. | 85/37 X |

FOREIGN PATENTS OR APPLICATIONS

| 691,273 | 5/1940 | Germany | 85/37 |
| 808,306 | 5/1951 | Germany | 85/37 |
| 18,633 | 4/1909 | Great Britain | 85/50 R |

Primary Examiner—Ramon S. Britts
Attorney—Robert E. Geauque

[57] ABSTRACT

A rivet fastener system for fastening together structural members. An annular collar surrounds the end of a ductile rivet shank and has a pre-upset orifice comprising a cylindrical surface portion which intersects with another surface portion, the intersecting surface portions being at an angle to one another which may be 90° and being connected by an orifice outer corner of small radius of curvature. During rivet upset, the end of the rivet shank and collar are plastically deformed to produce a new orifice surface which facilitates flow of shank material therethrough. The cylindrical surface portion can also initially form with the inside surface portion, an orifice inner corner having a small radius of curvature. The initial collar configuration has small blend corner radii with improved tensile capability and can be used with ductile rivet materials. In cases of highly ductile rivet material, the radius of curvature of the orifice corners can be zero (or sharp). The major objectives are the reversibility of installation of the collar adjacent the structure and low manufacturing costs associated with simplified orifice shape.

8 Claims, 3 Drawing Figures

PATENTED JUL 24 1973  3,747,466

IRWIN E. ROSMAN
INVENTOR.

BY R.E. Geangue

ATTORNEY

RIVET FASTENER SYSTEM

This application is a continuation-in-part of U. S. application Ser. No. 798,039, filed Feb. 10, 1969 by Irwin E. Rosman, now abandoned which, in turn, is a continuation-in-part of U. S. application Ser. No. 688,416, filed Dec. 6, 1967, now U. S. Pat. No. 3,426,641.

BACKGROUND OF THE INVENTION

The present invention relates to the upset of a rivet in a rivet fastener system utilizing an annular forming collar or die located around the rivet and circumferentially restrained during upset by a sleeve around the exterior circumferential surface of the collar. In this system as disclosed in applicant's U.S. Pat. No. 3,426,641, one form of initial interior orifice surface configuration of the die before rivet upset comprises, at least in part, a curved surface which progressively departs from the rivet shank as it extends from the structural member against which it is located. The arcuate shape of the orifice having substantially large radius of curvature is desirable to prevent cracking from occuring during the formation of high strength rivet alloys of low ductility. In addition, this shape also permits easy flow of the metal with lower forming loads. However, the machining of the initial curved orifice surface portion of the collar is difficult and time consuming and thus increases the cost of the collar; in addition, care must be taken during fastener installation to assure proper orientation of the collar adjacent the sheet surface.

SUMMARY OF THE INVENTION

The present invention, being a continuation-in-part of the above cited patent, uses the same system but teaches the use of a collar having an orifice shape which has small radii of curvature; such collar being easier to manufacture, and has, in the preferred configuration, reversibility of installation which is highly desirable. It is understood that different methods of collar retention such as providing the collar with a retention flange or sloping outer surface (as shown in FIGS. 6 and 7 of said referenced patent) can also be used with the collar of the present invention; however, such methods would preclude reversibility.

The present collar is used with ductile rivet materials, i.e., with materials having ductility corresponding to a $D_f/D_i$ ratio greater than approximately 1.3 for a substantial structural thickness range of rivet installations, said ratio being defined as the largest final diameter to the initial diameter ratio that is obtained upon cracking of an axially compressed, free standing cylindrical rod two diameters long. The $D_f/D_i$ ratio of 1.3 corresponds to ductility values of elongation and reduction in area of approximately equal and generally somewhat greater than 10 and 20 percent, respectively. As described in the referenced patent, the hoop strength of the collar if not restrained at its outside surface, would be insufficient to prevent plastic deformation of the outer circumference surface under rivet shank upset load.

The present invention pertains to the rivet fastener system as previously referred to herein, and provides an annular collar in which the pre-upset orifice collar configuration has an essentially cylindrical portion which intersects with an extended orifice portion which is at an angle to the rivet axis. This angle may be 90° or greater or less than 90°. This intersection for shaping the upset head will hereafter be referred to as the orifice outer corner. The opposite corner of the inner collar diameter adjacent the sheet will be referred to as the orifice inner corner. The intersection at the orifice outer corner is essentially a rounded corner whose radius is such that its ratio to the rivet shank diameter, for rivet materials having $D_f/D_i$ ratios as low as approximately 1.3, can be reduced to as low as approximately 0.02. The corner radius to shank diameter ratio for the orifice inner corner has an upper limit of approximately 0.05 to assure proper continuity between the collar and the hole in the structural member adjacent the collar. Such radii can easily be produced by non-machining processes, such as deburring, grit blasting, chemical milling, etc. The utilization of intersecting straight surface portions not having a large blend radius for the orifice shape greatly facilitates fabrication of the collar, since it is not necessary to produce a special cutting or forming tool to provide such a curved interior orifice surface. When the collar is symmetrical about an axis perpendicular to the rivet axis, it can be assembled around the rivet shank with either side surface adjacent a structural member. Therefore, mis-orientation of the collar on the rivet shank prior to rivet head upset is eliminated. In such a reversible collar for use in the rivet materials having the aforementioned ductility properties, the radius of both the inner and outer orifice corners must be such that the ratio of these radii to rivet shank diameter falls within the range of approximately 0.02 to 0.05. This range assures satisfactory formation of the upset head and also proper continuity between the collar orifice surface and the hole in the sheet adjacent the collar.

It will be seen that the present invention in the case of the rectangular collar shape is related to the 90° tension type collar illustrated in FIG. 5 of the referenced patent. With rivet materials having the aforementioned ductility properties, the outer corner radius can be reduced to a value as low as 0.02 times the shank diameter while providing an acceptable upset shank and head, i.e., without incurring unduly high stress concentration in the head fillet region. Further, it has been determined that the ratio of the corner radius to the shank diameter in the range of 0.02 to 0.05 is an important parameter in obtaining the required upset configuration of the collar at the orifice inner corner adjacent the sheet as well as at the orifice outer corner adjacent the head fillet, when a symmetrical configuration is used.

In cases where highly ductile rivet materials are used, i.e., materials having a $D_f/D_i$ ratio of approximately 1.7 or greater, the outer corner radius of the collar can be reduced to zero (or sharp corner) without cracking of the upset head of the rivet in the fillet region. It can be seen, from the embodiments in the referenced patent and those of this invention, that as the ductility of the rivet material increases, the slope angle of the extended orifice portion can increase to ninety degrees and the outer corner radius can decrease while producing an acceptable upset rivet head. The novelty of the embodiments of this invention teaches the use of acceptable ranges of rivet ductility that can be used with smaller radii of curvature of the collar outer orifice corner which will permit reversibility of the collar upon installation. This reversibility is obtained by limiting the outer corner radius to correspond with the range permissible for the inner corner radius. In addition, FIG. 5 of the referenced patent is described as a collar having an outer corner providing maximum tensile strength. However, this assumes that the upset rivet head diameter has expanded and conformed with the maximum slope of the 90° extended surface portion 34 of FIG. 5. It has been found hat in cases where lower upset forces are used, the upset head diameter does not fully expand to the 90° surface portion, thereby permitting wedging action to expand the collar and resulting in a lower tensile capability of the joint. It can therefore be seen that the reduced radius of the orifice outer corner of the collar will permit rivet heads formed with lower upset loads to engage a sufficient amount of the extended surface portion on the outer face of the collar to maximize the tensile capability of the riveted joint.

It is therefore a principal object of the invention to provide collars for use with ductile rivets in rivet fastener systems, which collars incorporate simply shaped surface portions and slightly rounded intersecting corners or sharp corners which are easy to fabricate, increases tensile capability of the riveted joint and provides reversible fastener installation.

A further object of the invention is to provide a collar of substantially rectangular cross section having an orifice with a cylindrical surface portion making approximately a right angle with an extended surface portion, such shape also precluding improper orientation of the collar during fastener installation.

These and other objects of the invention will become readily apparent from the accompanying description and drawings.

DESCRIPTION OF THE PREFERRED EMBODIMENT

Figure 1:
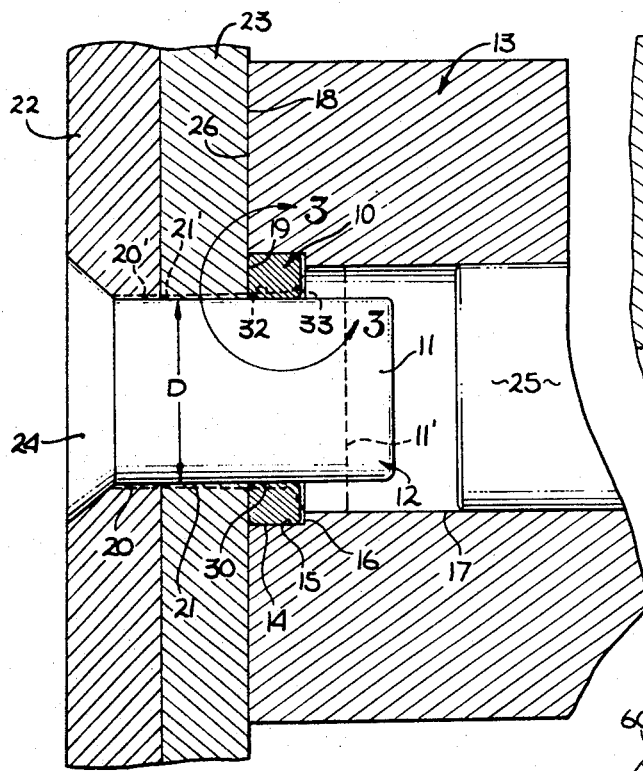
FIG. 1 is a section of two structural members with a collar of substantially rectangular cross section positioned around the rivet and surrounded by the sleeve.

The embodiment of the invention illustrated in FIG. 1 employs an annular collar or forming die 10 which is substantially rectangular in cross section prior to upset of the tail end 11 of the rivet shank 12. A sleeve 13 has a cylindrical interior surface 14 which engages the exterior circumference surface 15 of the collar and a step surface 16 connects surface 14 with the smaller interior surface 17 of the sleeve. The rivet shank of diameter D extends through aligned openings 20 and 21 in structural plates or members 22 and 23, respectively, and plate 22 is countersunk to receive the preformed head 24 on the end of the shank. When the end 18 of the sleeve bears against the outside surface 26 of plate 23, step surface 16 holds the inside extended surface 19 of collar 10 in close vicinity to the surface of plate 23. It is understood that the manufactured head can be of other configuration than that shown and that the plates are only typical of structural members. As previously stated, some properties of the collar (forming die) described in the referenced patent, apply in this case. As described in the referenced patent, the hoop strength of the collar if not restrained at its outside surface, would be insufficient to prevent plastic deformation of the outer circumference surface under rivet shank upset load. Further, the ratio of outside diameter to inside diameter (or rivet shank diameter) is preferably not in excess of about 1.75; and preferably the yield strength of the collar is equal to or below that of the rivet.

Figure 2:
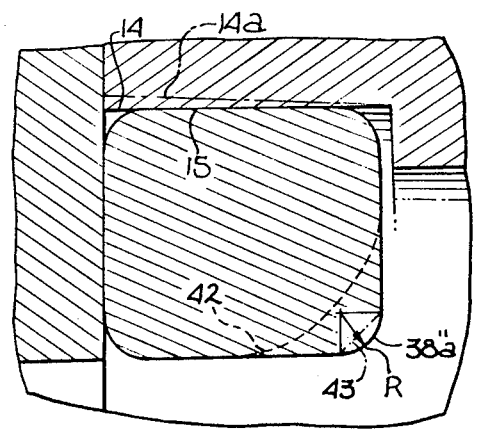
FIG. 2 is a section of the collar of FIG. 1, showing the relationship of its orifice outer corner to that of a collar of FIG. 5 in said U. S. Pat. No. 3,426,641.

A piston 25 is slidable in sleeve 13 into engagement with the end 11 of rivet shank 12 and when a longitudinal upset force is applied to the piston while head end 24 is restrained, the shank end 11 is upset to form a rivet head 11'. It is understood that the rivet head can be upset by other methods, i.e., the piston can be held stationary or can be replaced by an integral part of the sleeve, and the upset force is applied at the end opposite the sleeve. During upset, there is a mutual shaping action between the shank end 11 and the collar 10 and also, the collar acts as a forming die with orifice to extrude the shank into the holes in the structural plates. This extrusion results in an expansion of the holes 20 and 21 to form the enlarged diameters 20' and 21'. The external circumferential surface 15 of the collar 10 is restrained against expansion, under full upset load, by the surface 14 of the sleeve permitting the initial internal cylindrical orifice surface portion 30, the extended collar surface portion 31 and the orifice outer corner 38a of radius R therebetween to deform by plastic flow to form a smooth interior orifice surface 32 between points 32a and 32b (See dashed line of FIG. 3) including the upset orifice outer corner 38b which shapes the smooth fillet area 33 on the rivet head. The collar also deforms to fill the initial space 35, when provided, between extended collar surface 31 and step surface 16 and the final orifice surface is continuous with the interior surface 17 of the sleeve 13. Also, the collar orifice 32 is continuous with the swelled hole 21' in the structural plate 23 so that no excessive swelling at the surface of the plate around the hole 21 results to weaken the structure, as would happen if the collar was unrestrained by the sleeve, in which case the orifice would excessively expand during upset, thereby causing excessive hole swell. It has been found that if radius 38a (FIG. 3) is such that its ratio to the rivet shank diameter is as low as approximately 0.02 with rivet materials having $D_f/D_i$ ductility ratios of 1.3 and greater, that no unduly high stress concentration will result in the upset fillet region 33. The radius 42 in FIG. 2 represents a surface of larger radius such as illustrated in FIG. 5 of said U.S. Pat. No. 3,426,641 which is used for materials of lower ductility.

During rivet upset (FIG. 3) under the radial and axial compression forces on the collar, the radius of the pre-upset orifice inner corner 41 is reduced to that approaching a sharp corner when the pre-upset radius is approximately 0.05 times the shank diameter or less. If has been found that if the orifice inner corner radius ratio to the rivet shank diameter is substantially larger than 0.05, then upon upset of the rivet shank, the pocket P between inner corner 41 and the sheet surface will not be substantially eliminated by the reduction of the corner radius, permitting the rivet shank to be upset therein causing excessive hole deformation adjacent the collar.

It is desirable that inner corner radius 41 is made approximately equal to outer corner radius 38a (FIG. 3) so that the collar may be made reversible on installation. When the outer and inner corner radii of the orifice are held within the 0.02 to 0.05 approximate ratio with the shank diameter, satisfactory rivet upset conditions are obtained for utilization of a reversible collar.

Figure 3:
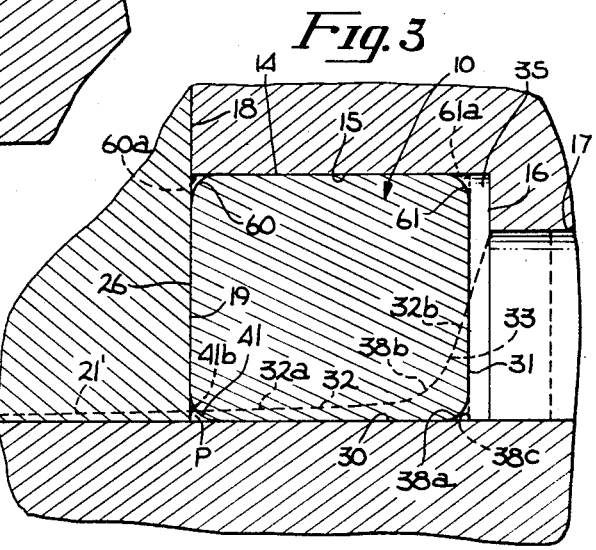
FIG. 3 is an enlargement of area 3—3 of FIG. 1 showing the final collar and head upset configuration.

It can also be seen that manufacturing methods to produce such small corner radii can be used to lower manufacturing costs, i.e., tumbling, deburring, chemical milling, coining. Such a configuration as indicated in FIG. 3, of a substantially rectangularly shaped collar having all corners approximately equal, can be produced by these methods and is reversible on installation. As shown in FIG. 2, the sleeve surface 14, which has a normal assembly clearance with collar surface 15, can have a small taper as illustrated by dashed line 14a. This configuration facilitates assembly and disassembly between the sleeve and the collar. After rivet upset, the collar surface 15 will expand slightly and conform with restraining surface 14a of the sleeve. This result after rivet upset is essentially the same at the outer periphery of the collar, as illustrated in FIG. 2, line 12' of the referenced patent. Such a tapered configuration of the sleeve surface 14a of the present invention can be used with a reversible collar having a maximum orifice inner corner radius of approximately 0.05 times the shank diameter while maintaining proper continuity between the collar orifice surface 32a and the hole surface 21' of the sheet, FIG. 3, under rivet upset conditions, and also while preventing excessive enlargement of the hole.

When highly ductile rivet materials are used, i.e., $D_f/D_i$ ratios of 1.7 or greater, the outer orifice corner may be sharp while permitting acceptable rivet head upset. Such a corner 38c is illustrated by dotted line in FIG. 3. A sharp orifice inner corner as illustrated in FIG. 3 and designated as 41b can be used with sharp corner 38c to provide reversibility of installation. This configuration can be produced by low cost manufacturing methods without requiring radiusing of the corners.

In general, it is preferred that the hardness of the collar relative to the rivet be such as to permit the upset head to deform the collar orifice into a smooth configuration during upset to provide an orifice shape which facilitates extrusion of the head into the orifice and still have enough projected transverse back surface on the head to resist design tensile loading. This forming is achieved principally by restraining the outer surface of the collar, permitting the inner surface portion of the collar to plastically deform under the loads transmitted from the rivet as it is progressively formed, as illustrated in FIG. 3. However, it has been found that if the collar is substantially softer than the rivet, considerable orifice deformation takes place, resulting in lower tensile capability. It has also been found acceptable to use collar materials harder than that of the rivet, provided that the rivet material has sufficient ductility to flow around the orifice outer corner.

Results have shown that when upsetting ¼ inch diameter rivets of A-286 stainless alloy and BETA III titanium alloy whose elongation and reduction in area are greater than 10 and 20 percent, respectively, that the collar orifice outer corner radius of values between 0.008 and 0.018 inches produces satisfactory rivet upset conditions. Similarly, for 3/16 inch diameter rivets of the above-mentioned alloys, the optimum range of the collar orifice outer corner radius was found to be 0.004 to 0.009 inches. It is understood that a broken edge such as surface 43 in FIG. 2, approximately equal to radius 38a'', can be used in place of radius 38a'''.

It has been found that rivet materials having $D_f/D_i$ ratios less than 1.3 can crack in the fillet region of the upset head when using orifice outer corner radii as low as 0.02 times the shank diameter. Examples of these materials are Ti 6AL4V heat treated to about 105,000 psi shear strength and 7075T6 aluminum alloy. However, 7075T73 aluminum alloy can be upset around such a slightly rounded outer corner. It has further been found that highly ductile rivet materials having $D_f/D_i$ ratios of 1.7 or more can be acceptably upset around a collar having a sharp outer corner. Typical examples of these materials are BETA III titanium alloy and A-286 stainless alloy heat treated to 95,000 psi shear strength. Difficulty has been encountered to so form these materials about a sharp corner when they are heat treated to higher shear values corresponding to $D_f/D_i$ ratios between 1.3 and 1.7. However, these latter ductility ratios would permit forming about the slightly rounded outer corner. In fact, if these same materials were heat treated to high enough shear strength value to produce $D_f/D_i$ ratios less than 1.3, cracking of the upset head can occur, as previously stated, even when a slightly rounded corner is used.

FIG. 3 also shows inner and outer peripheral corners 60 and 61 which have substantially the same radius as corners 41 and 38a. Also shown are inner and outer peripheral corners 60a and 61a which are sharp and correspond with sharp orifice corners 41b and 38c. Corners 60a and 41b are designated by dotted lead lines which indicate that these corners are adjacent structural surface 26 and adjacent sleeve 13 and rivet shank 11, respectively. This configuration would be produced without the manufacturing operations of radiusing, and for high ductility rivet materials having $D_f/D_i$ ratios of greater than 1.7 would permit acceptable head upset. It is preferred, however, that the inner corner at the outer periphery be rounded rather than sharp since, under conditions of high rivet upset loads, the upset had can force the collar into soft sheet materials. Indenting the sheet with a rounded corner at the outer periphery will minimize the high stress concentration in the sheet which would otherwise be obtained with a collar having a sharp corner at this location, such as 60 a.

I claim:

1. In a rivet fastener system for fastening together structural members, the combination of a rivet having an end to be upset, surrounded by an annular collar located adjacent a structural member and circumferentially restrained by the internal surface of a sleeve and means to exert an upsetting force on said rivet end to form an upset head; the improvement wherein said collar has a hoop strength insufficient to prevent plastic deformation of its outer circumferential surface under rivet upset load if not restrained at its outer surface; a pre-upset orifice for said collar having an internal cylindrical surface portion which intersects at its ends with extended surface portions; said intersections defining orifice inner and outer corners adjacent said rivet shank each having a small radius; said inner and outer corner radii having a ratio to the rivet shank diameter within the approximate range of 0.02 to 0.05; the pre-upset material of said rivet having elongation and reduction in area ductility properties greater than approximately 10 and 20 percent, respectively.

2. In the rivet fastener system as defined in claim 1, said inner and outer corner radii being approximately equal.

3. In a rivet fastener system for fastening together structural members, the combination of a rivet having an end to be upset, surrounded by an annular collar located adjacent a structural member and having an outer circumferential surface for receiving an external restraint resisting radial expansion of said outer surface which would otherwise take place during rivet upset without said restraint, the improvement comprising a pre-upset orifice for said collar having an internal cylindrical surface portion which intersects at its ends with extended surface portions; said intersection defining orifice inner and outer corners adjacent said rivet shank each having a small radius; said inner and outer corner radii having a ratio to the rivet shank diameter within the approximate range of 0.02 to 0.05; the pre-upset material of said rivet having a $D_f/D_i$ ratio greater than approximately 1.3; said $D_f/D_i$ ratio being defined as the largest final diameter to the initial diameter ratio that is obtained upon cracking of an axially compressed, free standing cylindrical rod two diameters long.

4. In a rivet fastening system as defined in claim 3 where said outer circumferential surface intersects at its ends with said extending surface portions to define peripheral inner and outer corners, said peripheral inner corner being round to prevent excessive stress concentration in said adjacent structural member under rivet upset resulting from depression of said collar into said adjacent structural member under high rivet upset forces.

5. In a rivet fastening system as defined in claim 4 wherein said orifice inner and outer corners and said peripheral inner and outer corners all have approximately the same radii.

6. In a rivet fastener system as defined in claim 3 wherein said extended surface portions are approximately perpendicular to said internal cylindrical surface portion over their entire surface areas.

7. In a rivet fastener system as defined in claim 3, said inner and outer corners having approximately the same radii for installational reversibility of the collar.

8. A rivet fastener system for fastening together structural members containing a rivet hole, the combination of a rivet having an end to be upset, surrounded by an annular collar located adjacent a structural member and having an outer circumferential surface for receiving an external restraint resisting radial expansion of said outer surface which would otherwise take place during rivet upset without said restraint, the improvement comprising a preset orifice for said collar having an internal cylindrical surface portion which intersects at its ends with flat extended surface portions each in a single plane and of substantially the same size; said intersections defining orifice inner and outer corners adjacent said rivet shank; the radii of said inner and outer corners having a ratio to the rivet shank diameter which decreases as the rivet ductility ratio $D_f/D_i$ increases, the maximum corner radius to shank diameter ratio for each corner being approximately 0.05 to assure proper continuity between said collar and the hole in said adjacent structural member after rivet upset said $D_f/D_i$ ratio being defined as the largest final diameter to the initial diameter ratio that is obtained upon cracking of an axially compressed, free standing cylindrical rod two diameters long, said outer circumferential surface intersecting at its ends with said extending surface portions to define peripheral inner and outer corners, said peripheral inner corner being round to prevent excessive stress concentration in said adjacent structural member under rivet upset resulting from depression of said collar into said adjacent structural member under high rivet upset force, said orifice inner and outer corners and said peripheral inner and outer corners all having approximately the same radii.

* * * * *